(12) United States Patent
Yura et al.

(10) Patent No.: US 10,326,782 B2
(45) Date of Patent: Jun. 18, 2019

(54) NETWORK MONITORING DEVICE AND COMPUTER PROGRAM PRODUCT

(71) Applicants: TOSHIBA DIGITAL SOLUTIONS CORPORATION, Kawasaki-shi (JP); TOYOTA JIDOSHA KABUSHIKI KAISHA, Toyota-shi (JP)

(72) Inventors: Koji Yura, Yokohama (JP); Takeshi Kitamura, Kawasaki (JP); Hideki Goto, Minato-ku (JP); Tomokazu Moriya, Setagaya-ku (JP)

(73) Assignees: TOSHIBA DIGITAL SOLUTIONS CORPORATION, Kawasaki-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 62 days.

(21) Appl. No.: 15/465,816

(22) Filed: Mar. 22, 2017

(65) Prior Publication Data
US 2018/0048663 A1  Feb. 15, 2018

(30) Foreign Application Priority Data
Aug. 9, 2016 (JP) .................................. 2016-156475

(51) Int. Cl.
*H04L 9/00* (2006.01)
*H04L 29/06* (2006.01)
(Continued)

(52) U.S. Cl.
CPC ........ *H04L 63/1416* (2013.01); *H04L 9/3297* (2013.01); *H04L 12/40* (2013.01);
(Continued)

(58) Field of Classification Search
CPC ............. H04L 63/1408; H04L 63/1416; H04L 63/1425; H04L 12/40; H04L 67/12
See application file for complete search history.

(56) References Cited

U.S. PATENT DOCUMENTS

| | | | |
|---|---|---|---|
| 2015/0172306 A1* | 6/2015 | Kim | H04L 63/1425 726/23 |
| 2015/0358351 A1 | 12/2015 | Otsuka et al. | |
| 2016/0205194 A1 | 7/2016 | Kishikawa et al. | |

FOREIGN PATENT DOCUMENTS

| | | |
|---|---|---|
| EP | 2 950 482 A1 | 12/2015 |
| JP | 2014-146868 A | 8/2014 |

(Continued)

OTHER PUBLICATIONS

Combined Office Action and Search Report dated Jul. 11, 2018 in Russian Patent Application No. 2017128092 (with English language translation), 10 pages.

(Continued)

*Primary Examiner* — Beemnet W Dada
(74) *Attorney, Agent, or Firm* — Oblon, McClelland, Maier & Neustadt, L.L.P.

(57) ABSTRACT

A network monitoring device according to an embodiment monitors a message that is periodically transmitted in a network in which a message identified by an identifier is transmitted and received, and includes a reception time recording unit and an unauthorized-transmission determination unit. The reception time recording unit records a reception time in association with the identifier, every time a message to be monitored is received. The unauthorized-transmission determination unit determines presence of an unauthorized transmission on the received message to be to be monitored, based on a latest reception time $T_i$, an m previous reception time $T_{i-m}$, a message transmission period F, and a constant σ determined in advance, in a period from the reception time $T_{i-m}$ to the reception time $T_i$, every time the message to be monitored is received.

15 Claims, 10 Drawing Sheets

(51) Int. Cl.
*H04L 9/32* (2006.01)
*H04L 12/40* (2006.01)
*H04L 29/08* (2006.01)

(52) U.S. Cl.
CPC ...... *H04L 63/1408* (2013.01); *H04L 63/1425* (2013.01); *H04L 67/12* (2013.01); *H04L 2012/40215* (2013.01); *H04L 2209/84* (2013.01)

(56) References Cited

FOREIGN PATENT DOCUMENTS

| | | |
|---|---|---|
| JP | 5919205 B2 | 5/2016 |
| KR | 2009-0063430 | 6/2009 |
| KR | 10-1472896 | 12/2014 |
| WO | WO 2015/170451 A1 | 11/2015 |

OTHER PUBLICATIONS

Japanese Office Action dated Jul. 3, 2018 in Japanese Patent Application No. 2016-156475 (with unedited computer generated English translation), 5 pages.

Dr. Charlie Miller, et al., "Adventures in Automotive Networks and Control Units" Def. Con., 2013, 101 pages, http://illmatics.com/car_hacking.pdf.

Yoshihiro Ujiie, et al., "Consideration about the behavior detection technique in the CAN message" Panasonic, 12th WOCS2, Jan. 21, 2015, 20 pages, http://www.ipa.go.jp/files/000043928.pdf.

Extended European Search Report dated Dec. 6, 2017 in Patent Application No. 17183969.9, 13 pages.

Office Action issued in corresponding Korean Patent Applicartion No. 10-2017-0066105 dated Jan. 11, 2019 (with English translation).

\* cited by examiner

FIG.4

| CAN ID | PERIOD [ms] | TRANSMIS-SION SOURCE BUS | PERIODIC MONITOR-ING | DESTINATION BUS | | |
|---|---|---|---|---|---|---|
| | | | | FIRST BUS | SECOND BUS | THIRD BUS |
| 0x001 | 12 | FIRST BUS | ○ | / | ○ | ○ |
| 0x002 | 36 | FIRST BUS | ○ | / | ○ | - |
| 0x003 | 60 | FIRST BUS | × | / | - | - |
| 0x004 | 45 | FIRST BUS | ○ | / | - | ○ |
| 0x005 | 6 | SECOND BUS | ○ | - | / | - |
| 0x006 | 8 | SECOND BUS | ○ | ○ | / | ○ |
| 0x007 | 24 | SECOND BUS | ○ | - | / | ○ |
| 0x008 | - | SECOND BUS | - | - | / | - |
| ... | ... | ... | | | | |

FIG.5

| CAN ID | RECEPTION TIME [μs] | | | |
|---|---|---|---|---|
| | THIRD PREVIOUS | SECOND PREVIOUS | PREVIOUS | LATEST |
| 0x001 | 617342 | 629329 | 640765 | 641334 |
| 0x002 | 522097 | 558331 | 594143 | 630355 |
| 0x004 | 503115 | 548483 | 593124 | 638721 |
| 0x005 | 621036 | 627513 | 633034 | 639267 |
| 0x006 | 614315 | 622121 | 630337 | 638145 |
| 0x007 | 564275 | 588548 | 612275 | 636552 |
| ... | | | | |
| ... | | | | |
| ... | | | | |

FIG.8

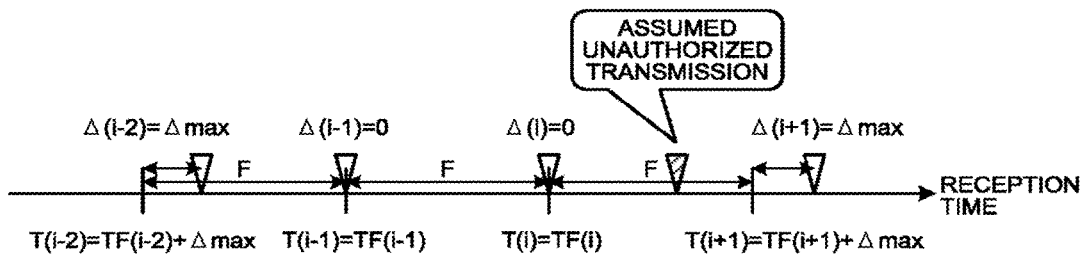

ASSUMED UNAUTHORIZED TRANSMISSION $\Delta(i-2) = \Delta max$   $\Delta(i-1) = 0$   $\Delta(i) = 0$   $\Delta(i+1) = \Delta max$

→ RECEPTION TIME $T(i-2) = TF(i-2) + \Delta max$   $T(i-1) = TF(i-1)$   $T(i) = TF(i)$   $T(i+1) = TF(i+1) + \Delta max$

FIG.9

| BYTE POSITION | NAME | DESCRIPTION |
|---|---|---|
| 1 | DETECTED BUS | INDICATE TRANSMISSION SOURCE BUS OF MESSAGE DETERMINED AS UNAUTHORIZED TRANSMISSION |
| 2 | DETECTED ID | INDICATE CAN ID OF MESSAGE DETERMINED AS UNAUTHORIZED TRANSMISSION |
| 3 | | |
| 4 | RECEPTION TIME | INDICATE LATEST RECEPTION TIME OF MESSAGE DETERMINED AS UNAUTHORIZED TRANSMISSION (10 μs UNIT AND 24 BITS CYCLE) |
| 5 | | |
| 6 | | |
| 7 | NUMBER OF DETECTION/ NUMBER OF OBJECTS | INDICATE ESTIMATION VALUE N OF NUMBER OF UNAUTHORIZED TRANSMISSION, AND (m+1) OF MESSAGE USED FOR DETERMINATION (4 BITS EACH) |
| 8 | PROCESSING | WHEN CAN ID OF MESSAGE DETERMINED AS UNAUTHORIZED TRANSMISSION IS IN DETECTION TIME PROCESSING TABLE, PROCESS INDICATE EITHER DISCARDING OR MASKING |

FIG.10

| CAN ID | PROCESSING | MONITORING BYTE | RISK VALUE | MASK VALUE |
|---|---|---|---|---|
| 0x001 | MASKING | 1 | 128 | 255 |
| 0x002 | MASKING | 7 | - | 0 |
| 0x004 | DISCARDING | 3 | 255 | - |
| 0x006 | MASKING | 1 | 100 | 0 |
| 0x007 | DISCARDING | - | | - |
| ... | ... | ... | | |
| ... | ... | ... | | |
| ... | ... | ... | | |

NETWORK MONITORING DEVICE AND COMPUTER PROGRAM PRODUCT

CROSS-REFERENCE TO RELATED APPLICATIONS

This application is based upon and claims the benefit of priority from Japanese Patent Application No. 2016-156475, filed on Aug. 9, 2016; the entire contents of which are incorporated herein by reference.

FIELD

Embodiments described herein relate generally to a network monitoring device and a computer program product.

BACKGROUND

For example, in an in-vehicle network installed in a vehicle, it is known that the vehicle behaves differently from an intention of a driver, by an unauthorized transmission of a message. As a countermeasure against such an attack to the network, a technology of detecting an unauthorized transmission of a message has been developed. For example, by focusing on periodic transmission of messages, a technology that performs a filtering process on a predetermined transmission period, a technology that detects period abnormalities and that discards a message that is transmitted in an unauthorized manner, and the like have been developed.

However, the main aim of the conventional technology that detects an unauthorized transmission by focusing on the periodic transmission of messages is to determine the legitimacy of a message upon receiving the message. Consequently, when an attempt is made to accurately determine the legitimacy of a message while taking into account the periodic variation and the like, the waiting time is increased and the real-time property is lost. On the other hand, when the real-time property is emphasized, the determination accuracy is lowered, and an unauthorized transmission is apt to be overlooked and misdetection tends to occur. Hence, there is a demand for a new technology capable of accurately determining the presence of an unauthorized transmission of a message without losing the real-time property.

BRIEF DESCRIPTION OF THE DRAWINGS

FIG. 4 is a diagram illustrating an example of a monitor transfer table;

FIG. 5 is a diagram illustrating an example of a monitor record table;

FIG. 8 is a diagram for explaining the constant σ;

FIG. 9 is a diagram illustrating an example of data formats of unauthorized-transmission detection messages;

FIG. 10 is a diagram illustrating an example of a detection time processing table;

DETAILED DESCRIPTION

Figure 1:
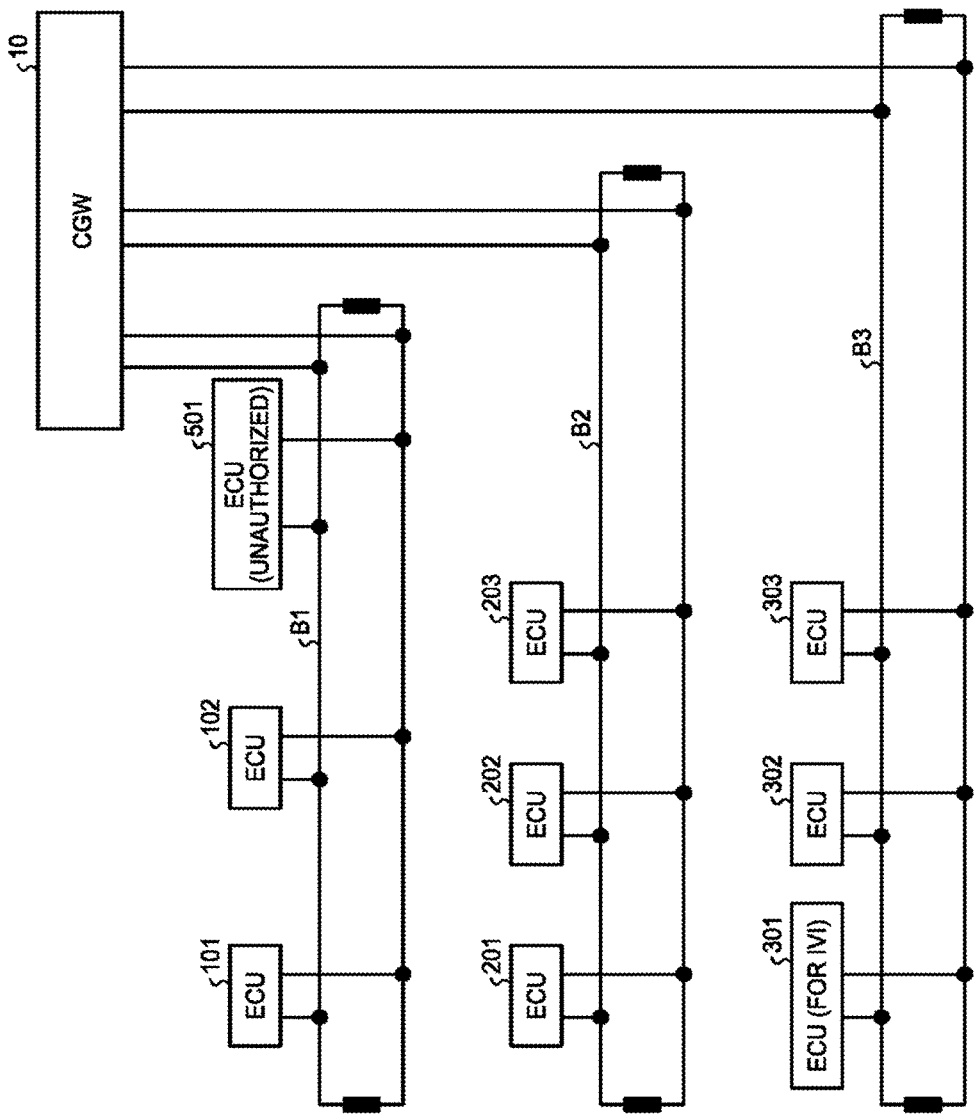
FIG. 1 is a diagram illustrating an example of a configuration of an in-vehicle network.

A network monitoring device according to an embodiment monitors a message that is periodically transmitted in a network in which a message identified by an identifier is transmitted and received, and includes a reception time recording unit and an unauthorized-transmission determination unit. The reception time recording unit records a reception time in association with the identifier, every time a message to be monitored is received. The unauthorized-transmission determination unit determines presence of an unauthorized transmission on the received message to be to be monitored, based on a latest reception time $T_i$, an m previous reception time $T_{i-m}$, a message transmission period F, and a constant σ determined in advance, in a period from the reception time $T_{i-m}$ to the reception time $T_i$, every time the message to be monitored is received.

Hereinafter, a network monitoring device and a computer program product of the embodiment will be described in detail with reference to the accompanying drawings. In the following, the network monitoring device and the computer program product of the embodiment are applied to an in-vehicle network that is to be installed in a vehicle. However, the network to which the network monitoring device and the computer program product of the embodiment can be applied, is not limited to the in-vehicle network. The network monitoring device and the computer program product of the embodiment can be broadly applied to a network in which a message identified by an identifier is transmitted and received, as well as the network in which at least a part of messages are periodically transmitted (repeatedly transmitted at a predetermined period).

Overview of Embodiment

In the network monitoring device of the present embodiment, a message to be monitored is a message that is periodically transmitted in an in-vehicle network such as a controller area network (CAN) in which a message identified by an identifier (ID) is transmitted and received, and the like. The network monitoring device of the present embodiment determines whether an unauthorized transmission message such as a "spoofed" message having the same ID as that of a regular message or the like is included in the message to be monitored that is identified by the ID. The network monitoring device of the present embodiment determines the presence of an unauthorized transmission, by determining whether a message transmitted in an unauthorized manner is included in some of the messages that have been received, in the messages to be monitored having the same ID, instead of determining whether the received message is a message that is transmitted in an unauthorized manner.

To determine an unauthorized transmission of a message to be monitored, in the present embodiment, the reception time is recorded in association with the ID of the message, every time a message to be monitored is received. When an unauthorized transmission is included in the message having the same ID as that of the received messages, and when focusing on the reception interval of the messages, the reception interval becomes shorter than a predetermined message transmission period, because a message that is transmitted in an unauthorized manner is included in addition to regular transmission messages. In the present embodiment, the presence of an unauthorized transmission is determined, using the change in the reception interval of messages such as the above.

The change in the reception interval of the messages may also be generated due to delay caused by various factors in the network. Thus, if the change in the reception interval between the messages is small, it is not possible to immediately determine whether the latest received message is an unauthorized transmission. However, provided an unauthorized transmission has taken place, even if the unauthorized transmission cannot be detected at the time when the message that is transmitted in an unauthorized manner is received, the reception interval changes largely when the next message is received. Consequently, it is possible to detect the unauthorized transmission upon receiving the next message. In other words, it is possible to determine whether an unauthorized transmission has taken place in a period from the reception time of the m previous message to the reception time of the latest message. It is to be noted that m is a natural number of one or more, and in the present embodiment, it is assumed that the value of m is one or two. However, the similar effects can be obtained even if the value of m is three or more.

In this manner, in the present embodiment, the presence of an unauthorized transmission on a message to be monitored is determined in a period from the reception time of the m previous message to the reception time of the latest message. For example, when it is determined that an unauthorized transmission has taken place, predetermined processing for fraud detection such as transmitting a fraud detection message including the ID of the message to be monitored that is transmitted in an unauthorized manner, and the like, will be executed.

Configuration Example of In-Vehicle Network

FIG. 1 is a diagram illustrating an example of a configuration of an in-vehicle network in which the network monitoring device of the present embodiment is applied. The in-vehicle network illustrated in FIG. 1 is a network in which communication is performed among electronic control units (hereinafter, referred to as "ECUs") that are mounted on a vehicle. A large number of ECUs are mounted on the vehicle. The large number of ECUs are disposed on a plurality of buses (in the example in FIG. 1, a first bus B1, a second bus B2, and a third bus B3) in a distributed manner, and mutually transmit and receive messages. In the present embodiment, it is assumed that the ECUs communicate based on the CAN protocol.

In the example illustrated in FIG. 1, as authorized ECU ECUs 101 and 102 are connected to the first bus B1, ECUs 201, 202, and 203 are connected to the second bus B2, and ECUs 301, 302, and 303 are connected to the third bus B3. Among the above, the ECU 301 connected to the third bus B3 is an ECU for an in-vehicle infotainment (IVI). The ECU 301 is connected to a digital communication module (DCM), which is not illustrated, and also connected to an Internet Protocol (IP) network outside the vehicle, via a mobile communication network.

A central gateway (CGW) 10 is connected to the first bus B1, the second bus B2, and the third bus B3. When an ECU on a certain bus transmits a message to an ECU on the other bus, the CGW 10 transfers the message. In the present embodiment, the CGW 10 functions as the network monitoring device described above.

In the example illustrated in FIG. 1, an ECU 501 that is an unauthorized ECU is connected to the first bus B1. In the present embodiment, it is assumed that a message (message transmitted in an unauthorized manner) having the same ID as that of a message (message transmitted in an authorized manner) to be monitored that is transmitted from the ECU that periodically transmits messages, among the authorized ECUs, is to be transmitted from the unauthorized ECU 501.

The configuration of the in-vehicle network illustrated in FIG. 1 is merely an example, and the configuration of the in-vehicle network to which the network monitoring device of the present embodiment is applied, is not limited thereto. Furthermore, the communication method is not limited to the CAN, and the communication among the ECUs may be performed using the other communication method. Networks having a different communication method from each other may be connected via the CGW 10. In the present embodiment, the CGW 10 functions as the network monitoring device. However, the other one or more ECUs may function as the network monitoring device instead of the CGW 10, or with the CGW 10. Furthermore, a network monitoring device different (independent) from the CGW 10 and the ECU may be connected to the in-vehicle network.

Example of Configuration of CGW (Network Monitoring Device)

Figure 2:
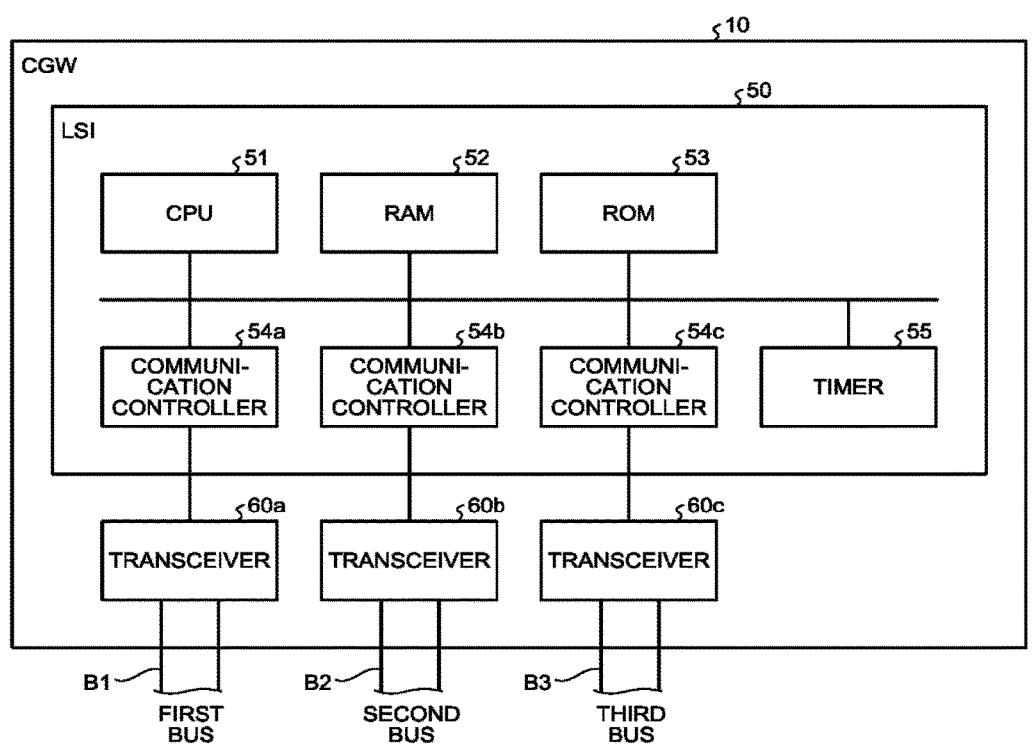
FIG. 2 is a block diagram illustrating an example of a hardware configuration of a central gateway (CGW)

FIG. 2 is a diagram illustrating an example of a hardware configuration of the CGW 10 that functions as the network monitoring device of the present embodiment. As illustrated in FIG. 2, the CGW 10 includes a large-scale integration (LSI) 50, a transceiver 60a connected to the first bus B1, a transceiver 60b connected to the second bus B2, and a transceiver 60c connected to the third bus B3. The transceivers 60a, 60b, and 60c perform analog processing such as converting differential potentials in the first bus B1, the second bus B2, and the third bus B3 into digital signals, or converting digital signals into differential potentials.

The LSI 50 is an integrated circuit (micro-computer) that performs digital signal processing, and a central processing unit (CPU) 51, a random-access memory (RAM) 52, a read-only memory (ROM) 53, communication controllers 54a, 54b, and 54c, a timer 55, and the like are mounted thereon. The CPU 51 is a processor that executes a predetermined computer program, and that controls an overall operation of the CGW 10. The RAM 52 is memory that acts as a work area when the CPU 51 executes a computer program. The ROM 53 is memory that stores therein a computer program and data executed by the CPU 51. Each of the communication controllers 54a, 54b, and 54c is a controller that transmits a message to the buses (first bus B1, second bus B2, and third bus B3) and that receives messages from the buses, in cooperation with the transceivers 60a, 60b, and 60c. For example, the timer 55 measures time to be handled by the CGW 10, and measures time used for managing schedule, recording a reception time, which will be described below, and the like.

FIG. 2 illustrates an example of the hardware configuration of the CGW 10. It is to be noted that the hardware configurations of the other ECUs are basically the same as the hardware configuration of the CGW 10 illustrated in FIG. 2. In the configuration example illustrated in FIG. 2, the CAM 10 is connected to three buses of the first bus B1, the second bus B2, and the third bus B3. Thus, the CGW 10 includes the three transceivers 60a, 60b, and 60c corresponding to the three buses as well as the communication controllers 54a, 54b, and 54c in the LSI 50. However, it is not limited thereto, and each ECU may include a transceiver and a communication controller corresponding to the bus to which the ECU is connected.

For example, the function as the network monitoring device of the present embodiment can be implemented in cooperation with the hardware and the software (computer program) of the CGW 10 described above. In other words, the CGW 10 can function as the network monitoring device, by storing a computer program that allows the CGW 10 to function as the network monitoring device in the ROM 53, and by causing the CPU 51 to read out and execute the computer program that is stored in the ROM 53, using the RAM 52 as a work area.

Figure 3:
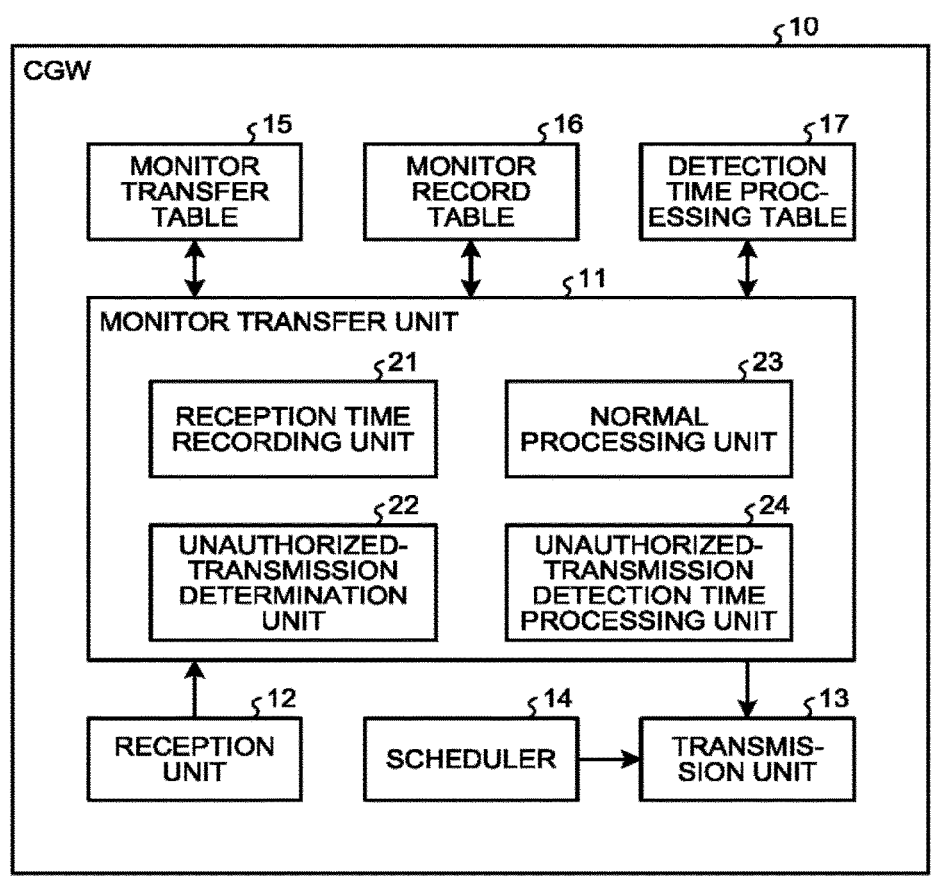
FIG. 3 is a block diagram illustrating an example of a functional configuration of the CGW.

FIG. 3 is a block diagram illustrating an example of a functional configuration of the CGW 10 that functions as the network monitoring device of the present embodiment. As illustrated in FIG. 3, the CGW 10 includes a monitor transfer unit 11, a reception unit 12, a transmission unit 13, and a scheduler 14, as functional components. The reception unit 12 is a function that receives a message via the communication controllers 54a, 54b, and 54c. The transmission unit 13 is a function that transmits a message via the communication controllers 54a, 54b, and 54c. The scheduler 14 manages the transmission timing of a message from the transmission unit 13. The CGW 10 also includes a monitor transfer table 15, a monitor record table 16, and a detection time processing table 17, as tables that are referred to, or read and written by the monitor transfer unit 11.

FIG. 3 is an example of a functional configuration implemented in cooperation with the hardware and the software of the CGW 10. It is to be noted that in the functional configuration of the other ECU, the monitor transfer unit 11 is replaced by the original function of the ECU, but the reception unit 12, the transmission unit 13, and the scheduler 14 are provided as in the CGW 10.

The monitor transfer unit 11 is the main function of the network monitoring device of the present embodiment. The monitor transfer unit 11 includes reception time recording unit 21, an unauthorized-transmission determination unit 22, a normal processing unit 23, and an unauthorized-transmission detection time processing unit 24.

Every time the reception unit 12 receives a message to be monitored, the reception time recording unit 21 records the reception time of the message in association with the ID (in this example, a CAN ID) of the message. The reception time recording unit 21 refers to the monitor transfer table 15, to determine whether the message that is received by the reception unit 12 is the message to be monitored.

FIG. 4 is a diagram illustrating an example of the monitor transfer table 15. The monitor transfer table 15 illustrated in FIG. 4 indicates a period when messages are periodically transmitted (message transmission period F, which will be described below), a transmission source bus, whether periodic monitoring is required, and a destination bus for each CAN ID of the message that is received and transmitted in the in-vehicle network. "O" in the periodic monitoring indicates that the message with the CAN ID is a message to be monitored. "-" indicates that the message cannot be monitored because it is not periodically transmitted. "x" indicates that the message is periodically transmitted but is not a message to be monitored. "O" in the destination bus indicates that the bus is the destination. "/" indicates that the message cannot be transferred because the bus is the transmission source bus. "-" indicates that the message is not to be transferred to the bus.

The reception time recording unit 21 confirms whether the periodic monitoring corresponding to the CAN ID of the message that is received by the reception unit 12 is indicating "O", by referring to the monitor transfer table 15 as illustrated in FIG. 4. Consequently, the reception time recording unit 21 can determine whether the message that is received by the reception unit 12 is the message to be monitored. When the message received by the reception unit 12 is the message to be monitored, the reception time recording unit 21 records the reception time of the message in the monitor record table 16.

FIG. 5 is a diagram illustrating an example of the monitor record table 16. Every time the reception unit 12 receives a message to be monitored, the reception time recording unit 21 records the reception time of the message in association with the CAN ID, in monitor record table 16. The reception time recorded in the monitor record table 16 is used when the unauthorized-transmission determination unit 22, which will be described below, determines the presence of an unauthorized transmission. Thus, the reception time older than the reception time of the m previous message that is required when the unauthorized-transmission determination unit 22 determines an unauthorized transmission, may be erased from the monitor record table 16. In the monitor record table 16 illustrated in FIG. 5, three previous reception times from the latest reception time are recorded. For example, the reception time to be recorded in the monitor record table 16 measured using the timer 55 described above.

The unauthorized-transmission determination unit 22 determines the presence of an unauthorized transmission on the message to be monitored that is received by the reception unit 12, based on the latest reception time $T_i$, the m previous reception time $T_{i-m}$, the message transmission period F, and the predetermined constant σ, in a period from the reception time $T_{i-m}$ to the reception time $T_i$, every time the reception unit 12 receives a message to be monitored, in other words, every time the reception time recording unit 21 records the latest reception time of the message to be monitored in the monitor record table 16.

For example, the unauthorized-transmission determination unit 22 calculates an estimation value N of the number of unauthorized transmissions in the period from the reception time $T_{i-m}$ to the reception time $T_i$, using the following formula (1), based on the latest reception time $T_i$, the m previous reception time $T_{i-m}$, the message transmission period F, and the predetermined constant σ, of the message to be monitored that is received by the reception unit 12. When N is equal to or more than one, the unauthorized-transmission determination unit 22 determines that an unauthorized transmission has taken place.

$$N = m - \text{INT}((T_i - T_{i-m} + \sigma)/F) \qquad (1)$$

In the formula (1), INT (X) is a function (INT function) for calculating an integer part of X. In other words, the above formula (1) is a calculation formula for acquiring an integer part k of $(T_i - T_{i-m} + \sigma)$, and calculating the estimation value N of the number of unauthorized transmissions that is expressed by m-k.

The constant σ will now be described. In many cases, in the ECU that periodically transmits messages on the in-vehicle network such as the CAN, the transmission unit (see FIG. 3) that is implemented by software is activated by a periodic interruption of a timer. A message is sent to the bus via the transceiver, by the processes performed by the transmission unit and the communication, controller (see FIG. 2). In this process, the periodic interruption of the timer occurs with high accuracy, but delay occurs due to the following various factors before the message is sent to the bus.

Figure 6:
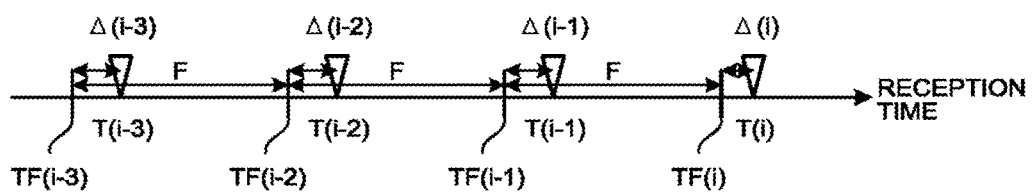
FIG. 6 is a diagram for explaining a constant σ.

- Wait for the termination of the currently running software
- Activation priority in the scheduler's waiting queue
- Message transmission priority in the communication controller
- Wait for the completion of message transmission on the bus
- Adjusting the transmission start time of a message waiting for transmission, on the bus Thus, when T(i) is the reception time of a message transmitted in an authorized manner, as illustrated in FIG. 6, this T(i) can be expressed using a periodic interruption time TF(i) of the timer and delay $\Delta(i)(\Delta(i)>0)$ from the periodic interruption time of the timer. It is to be noted that TF(i) and $\Delta(i)$ cannot be observed from outside.

Figure 7:
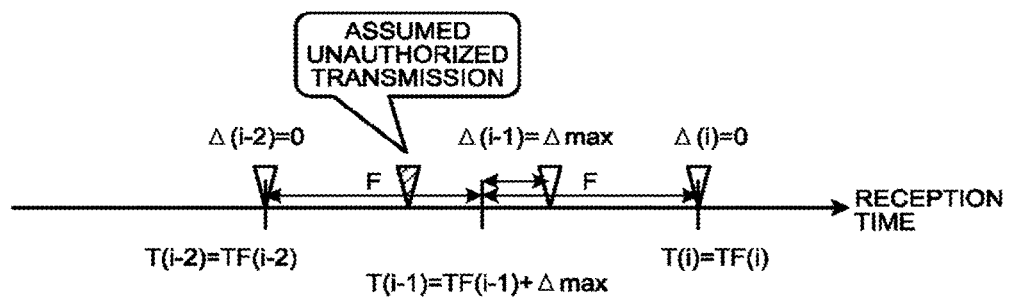
FIG. 7 is a diagram for explaining the constant σ.

A case of m=1 will now be analyzed. As illustrated in FIG. 7, when $\Delta(i-2)=\Delta(i)=0$, and when $\Delta(i-1)=\Delta$max ($\Delta$max is the maximum value of delay that is assumed on designing the in-vehicle network), a condition (A) for not determining a authorized transmission as an unauthorized transmission in the shortest authorized transmission section (T(i-1), T(i)) is $(T(i)-T(i-1)+\sigma)/F=(F-\Delta max+\sigma)/F\geq 1$, in other words, $\Delta max\leq\sigma$. Furthermore, a condition B for detecting an unauthorized transmission in the longest authorized transmission section (T(i-2), T(i-1)) is $((T(i-1)-T(i-2))/2+\sigma)/F=((F+\Delta max)/2+\sigma)/F<1$, in other words, $\Delta max+2\sigma<F$. However, when a smaller interval between the last and next authorized transmissions is the maximum unauthorized transmission between the reception time T(i-2) and the reception time T(i-1) of the authorized transmissions, it is $(T(i-1)-T(i-2))/2$.

From the condition (A) and the condition (B) described above, when m=1, at the time when $\Delta$max satisfies $\Delta max<F/3$, the condition required for the constant $\sigma$ to correctly detect the unauthorized transmission is $\Delta max\leq\sigma<(F-\Delta max)/2$. It is preferable to set the constant $\sigma$ to a small value in a range that satisfies the required condition described above, because cases that detection of an unauthorized transmission is delayed are reduced, as the value of the constant $\sigma$ is reduced. In other words, detection of an unauthorized transmission is reduced at the timing when the next authorized transmission is received, instead of the timing when the unauthorized transmission is received.

In the in-vehicle network, communication errors sometimes increase temporarily due to the communication environment and the state of the device (such as temperature). In the CAN, when a communication error occurs, the communication controller automatically resends the message. Thus, in such a case, a large delay occurs in the entire bus. In designing the in-vehicle network, a certain degree of communication error is taken into consideration, but the worst communication error is not necessarily taken into consideration. Thus, in the actual in-vehicle network, delay exceeding the maximum value of delay $\Delta$max that is assumed on designing may occur. By setting the constant $\sigma$ larger than $\Delta$max, it is possible to prevent an erroneous determination when unexpected delay such as the above occurs.

Next, a case of m=2 will be analyzed. As illustrated in FIG. 8, when $\Delta(i-1)=\Delta(i)=0$, and when $\Delta(i-2)=\Delta(i+1)=\Delta max$, a condition C for not determining the authorized transmission as an unauthorized transmission in the shortest authorized transmission section (T(i-2), T(i)) is $(T(i)-T(i-2)+\sigma)/F=(2F-\Delta max+\sigma)/F\geq 2$, in other words, $\Delta max\leq\sigma$. Furthermore, a condition D for detecting an unauthorized transmission in the longest authorized transmission section (T(i), T(i+1)) is $(T(i+1)-T(i)+\sigma)/F=(F+\Delta max+\sigma)/F<2$, in other words, $\Delta max+\sigma<F$.

From the conditions (C) and (D) described above, when m=2, at the time when $\Delta$max satisfies $\Delta max<F/2$, the condition required for the constant $\sigma$ to correctly detect the unauthorized transmission is $\Delta max\leq\sigma<F-\Delta max$. Similar to when m=1, it is preferable to set the constant $\sigma$ to a small value in a range that satisfies the above required condition, because cases that detection of an unauthorized transmission is delayed are reduced, as the value of the constant $\sigma$ is reduced. Furthermore, when m=2, an unauthorized transmission can be detected without fail, when the first and last messages of the three messages are the authorized transmissions.

Next, a case of m=3 will be analyzed similarly as the case of m=2. When $\Delta=(i-2)=\Delta(i-1)=\Delta(i)=0$, and when $\Delta(i-3)=\Delta(i+1)=\Delta max$, a condition (E) for not determining the authorized transmission as an unauthorized transmission in the shortest authorized transmission section (T(i-3), T(i)) is $(T(i)-T(i-3)+\sigma)/F=(3F-\Delta max+\sigma)/F\geq 2$, in other words, $\Delta max\leq\sigma$. Furthermore a condition (F) for detecting an unauthorized transmission in the longest authorized transmission section (T(i-1), T(i+1)) is $(T(i+1)-T(i-1)+\sigma)/F=(2F+\Delta max+\sigma)/F<3$, in other words, $\Delta max+\sigma<F$.

From the condition (E) and the condition (F) described above, when m=3, at the time when $\Delta$max satisfies $\Delta max<F/2$, the condition required for the constant $\sigma$ to correctly detect the unauthorized transmission is $\Delta max\leq\sigma<F-\Delta max$, as when m=2. It is also possible to similarly analyze when m>3. In other words, when m$\geq$2, an unauthorized transmission can be correctly detected when the constant $\sigma$ is set to a value that satisfies $\Delta max\leq\sigma<F-\Delta max$.

In the above, the unauthorized-transmission determination unit 22 calculates the estimation value N of the number of unauthorized transmissions in the period from the reception time $T_{i-m}$ to the reception time $T_i$ using the above formula (1), and determines the presence of an unauthorized transmission in the period from the reception time $T_{i-m}$ to the reception time $T_i$, by determining whether N is equal to or more than one. However, the method of determining the presence of an unauthorized transmission in the period from the reception time $T_{i-m}$ to the reception time $T_i$ is not limited to the above example. For example, the unauthorized-transmission determination unit 22 may set a threshold M to be $M=m\times F-\sigma$, and determine that an unauthorized transmission has taken place, when $T_i-T_{i-m}$ is less than the threshold M. In this case, the threshold M may be calculated every time the reception unit 12 receives a message to be monitored. However, when the threshold M for each message to be monitored is calculated and stored in advance, it is possible to reduce the processing time for determining the presence of an unauthorized transmission.

When the message received by the reception unit is not the message to be monitored, or when the unauthorized-transmission determination unit 22 determines that an unauthorized transmission has not taken place, the normal processing unit 23 performs normal processing on the message that is received by the reception unit 12. In this example, the normal processing is processing based on the original function of the CGW 10, such as processing of transferring a message received from a certain bus to another bus. When the network monitoring device of the present embodiment is implemented by the other ECU instead of the CGW 10, the normal processing is processing based on the original function of the certain ECU.

When the unauthorized-transmission determination unit 22 determines that an unauthorized transmission has taken place, the unauthorized-transmission detection time processing unit 24 executes predetermined unauthorized-transmission detection time processing. For example, the unauthorized-transmission detection time processing executed by the unauthorized-transmission detection time processing unit 24 includes processing of transmitting an unauthorized-transmission detection message including the CAN ID of the message to be monitored that is determined as unauthorized transmission, to the network. More specifically, for example, an unauthorized-transmission detection message as illustrated in FIG. 9 is transmitted to the transmission source bus and the destination bus of the message to be monitored that is determined as unauthorized transmission. FIG. 9 illustrates an example of data formats of unauthorized-transmission detection messages.

For example, when the transmission source bus of the message to be monitored that is determined as an unauthorized transmission, is the third bus B3 including the ECU 301 for IVI having a function of connecting to the outside of the vehicle, the unauthorized-transmission detection time processing may further include a process of stopping all the normal processes (such as transferring the message to the other bus) on the message that is received from the third bus B3, thereafter.

Furthermore, for example, the unauthorized-transmission detection time processing may further include a process of discarding a message to be monitored that is received by the reception unit 12 or masking a certain position of the message to be monitored that is received by the reception unit 12, according to the detection time processing table 17 as illustrated in FIG. 10. FIG. 10 is a diagram illustrating an example of the detection time processing table 17 that is referred to by the unauthorized-transmission detection time processing unit 24. The detection time processing table 17 illustrated in FIG. 10 indicates a process of either discarding or masking, a monitoring byte, a risk value, and a mask value when the process is masking, for each CAN ID of the message to be monitored, on which either discarding or masking is to be performed.

When the unauthorized-transmission determination unit 22 determines that an unauthorized transmission has taken place, the unauthorized-transmission detection time processing unit 24 refers to the detection time processing table 17, and confirms whether the CAN ID of the message to be monitored that is received by the reception unit 12 is registered in the detection time processing table 17. When the CAN ID of the message to be monitored that is received by the reception unit 12 is registered in the detection time processing table 17, the unauthorized-transmission detection time processing unit 24 confirms whether the process corresponding to the CAN ID is discarding or masking. When the process is discarding, the unauthorized-transmission detection time processing unit 24 refers to the monitoring byte and the risk value corresponding to the CAN ID, and when the value of the monitoring byte of the message to be monitored that is received by the reception unit 12 matches with the risk value, the unauthorized-transmission detection time processing unit 24 discards the message to be monitored. Furthermore, when the monitoring byte corresponding to the CAN ID indicates "-", the unauthorized-transmission detection time processing unit 24 discards the message to be monitored that is received by the reception unit 12.

When the process corresponding to the CAN ID of the message to be monitored that is received by the reception unit 12 is masking, the unauthorized-transmission detection time processing unit 24 refers to the monitoring byte, the risk value, and the mask value of the corresponding CAN ID, and when the value of the monitoring byte of the message to be monitored that is received by the reception unit 12 matches with the risk value, the unauthorized-transmission detection time processing unit 24 masks the value of the monitoring byte with the mask value, and transfers the message to be monitored that is received by the reception unit 12 from the transmission unit 13 to the destination bus. Furthermore, when the risk value corresponding to the CAN ID indicates "-", the unauthorized-transmission detection time processing unit 24 masks the value of the monitoring byte with the mask value, and transfers the message to be monitored that is received by the reception unit 12 from the transmission unit 13 to the destination bus.

As described above, in the present embodiment, the presence of an unauthorized transmission on the message to be monitored having the same CAN ID, in the period from the reception time $T_{i-m}$ of the m previous message to the latest reception time $T_i$ is determined, instead of determining whether the message is an unauthorized transmission, upon receiving the message to be monitored. Consequently, when it is determined that an unauthorized transmission has taken place, the unauthorized-transmission detection message described above is transmitted, and a process such as stopping the normal processing based on the condition, discarding or masking the message, or the like is performed as an additional process, instead of discarding the received message or the like as in a conventional method.

Operation Explanation on CGW (Network Monitoring Device)

Figure 11:
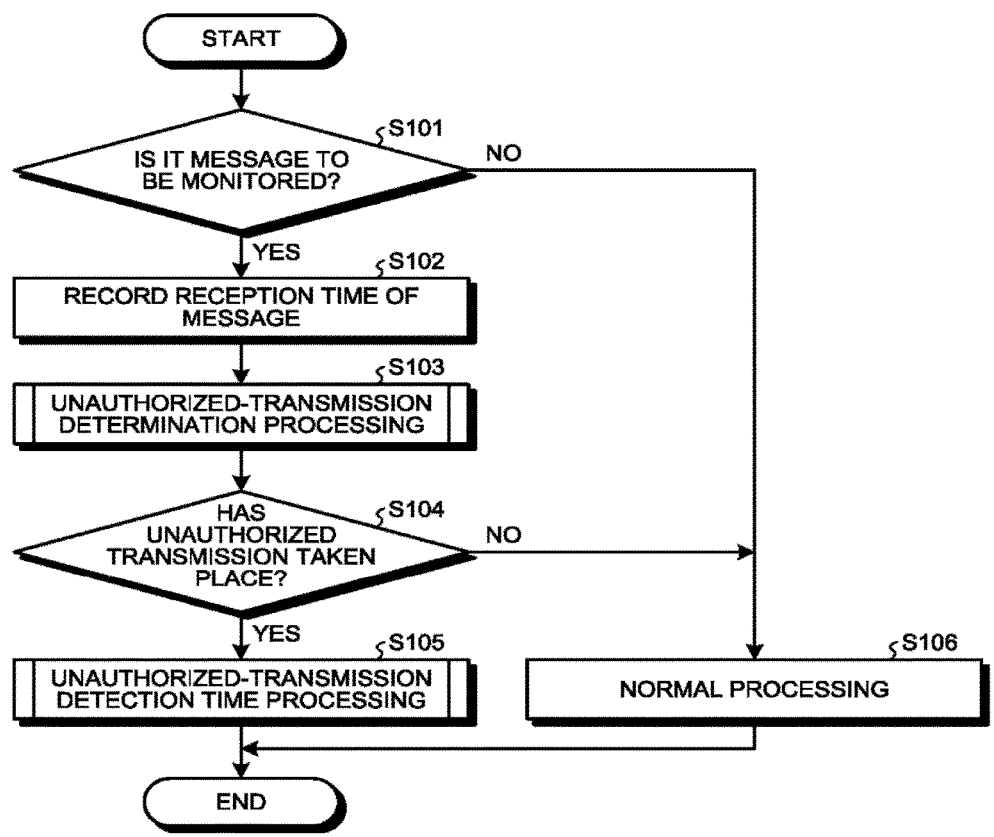
FIG. 11 is a flowchart illustrating a series of processing procedures executed by a monitor transfer unit.

Next, an operation example of the CGW 10 of the present embodiment will be described. An overview of the processing procedure performed by the CGW 10 will be described with reference to FIG. 11. FIG. 11 is a flowchart illustrating a series of processing procedures executed by the monitor transfer unit 11 of the CGW 10, every time the reception unit 12 receives a message.

When the reception unit 12 receives a message, the reception time recording unit 21 of the monitor transfer 11 refers to the monitor transfer table 15, and determines whether the received message is a message to be monitored (step S101). When the received message is the message to be monitored (Yes at step S101), the reception time recording unit 21 records the reception time of the message in association with the CAN ID, in the monitor record table 16 (step S102).

Figure 12A:
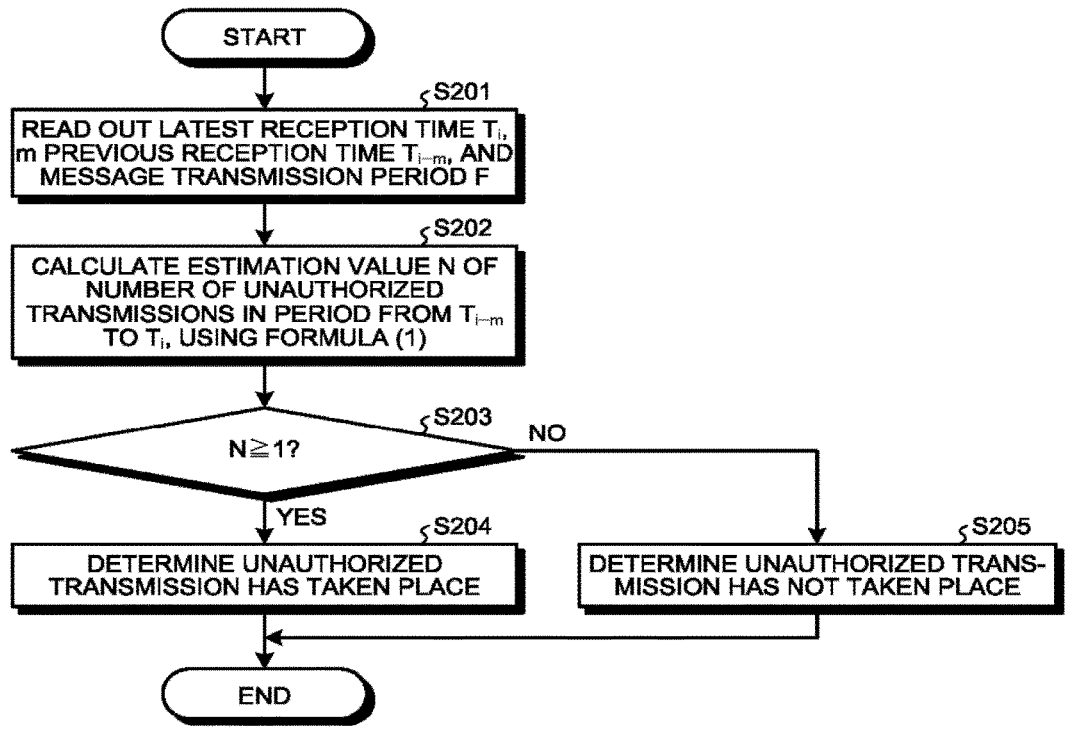
FIG. 12A is a flowchart illustrating an example of a processing procedure of unauthorized-transmission determination processing.
Figure 12B:
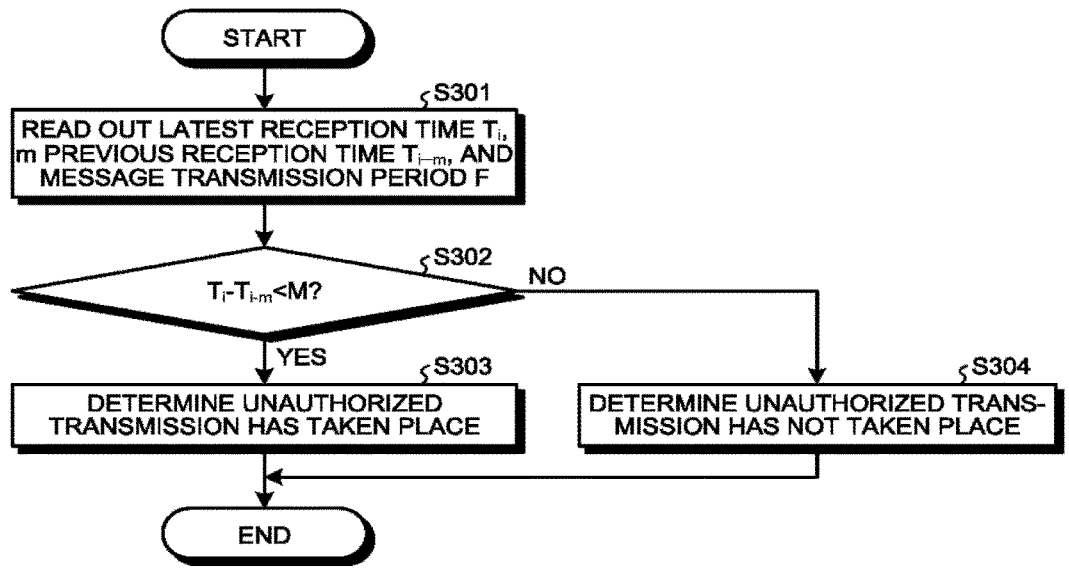
FIG. 12B is a flowchart illustrating another example of the processing procedure of the unauthorized-transmission determination processing.

Next, the unauthorized-transmission determination unit 22 executes the unauthorized-transmission determination processing illustrated in FIG. 12A or FIG. 12B (step S103). As a result of the unauthorized-transmission determination processing, when it is determined that an unauthorized transmission has taken place (Yes at step S104), the unauthorized-transmission detection time processing unit 24 executes the unauthorized-transmission detection time processing illustrated in FIG. 13 (step S105). On the other hand, as a result of the unauthorized-transmission determination processing, when it is determined that an unauthorized transmission has not taken place (No at step S104), or when the message received by the reception unit 12 is not the message to be monitored (No at step S101), the normal processing unit 23 executes normal processing on the message that is received by the reception unit 12 (step S106).

Next, an example of the unauthorized-transmission determination processing at step S103 in FIG. 11 will be described with reference to FIG. 12A. FIG. 12A is a flowchart illustrating an example of a processing procedure of the unauthorized-transmission determination processing executed by the unauthorized-transmission determination unit 22.

When the unauthorized-transmission determination processing illustrated in FIG. 12A is started, the unauthorized-transmission determination unit 22 reads out the latest reception time $T_i$ as well as the m previous reception time $T_{i-m}$ of the messages that are received by the reception unit 12 from the monitor record table 16, and reads out the message transmission period F from the monitor transfer table 15 (step S201). The unauthorized-transmission determination unit 22 then calculates the estimation value N of the number of unauthorized transmissions in the period from $T_{i-m}$ to $T_i$, using the above formula (1), based on the reception time $T_i$, the reception time $T_{i-m}$, the message transmission period F, and the constant σ determined according to the value of m, that are read out at step S201 (S202).

Next, the unauthorized-transmission determination unit 22 determines whether the estimation value N of the number of unauthorized transmissions calculated at step S202 is equal to or more than one (step S203). When the estimation value N of the number of unauthorized transmissions is equal to or more than one (Yes at step S203), the unauthorized-transmission determination unit 22 determines that an unauthorized transmission has taken place in the period from $T_{i-m}$ to $T_i$ (step S204). When the estimation value N of the number of unauthorized transmissions is zero (No at step S203), the unauthorized-transmission determination unit 22 determines that an unauthorized transmission has not taken place in the period from $T_{i-m}$ to $T_i$ (step S205).

Next, another example of the unauthorized-transmission determination processing at step S103 in FIG. 11 will be described with reference to FIG. 12B. FIG. 12B is a flowchart illustrating another example of the processing procedure of the unauthorized-transmission determination processing executed by the unauthorized-transmission determination unit 22.

When the unauthorized-transmission determination processing illustrated in FIG. 12B is started, the unauthorized-transmission determination unit 22 reads out the latest reception time $T_i$ as well as the m previous reception time $T_{i-m}$ of the messages that are received by the reception unit 12 from the monitor record table 16, and reads out the message transmission period F from the monitor transfer table 15 (step S301). The unauthorized-transmission determination unit 22 then determines whether $T_i - T_{i-m} < M$ (M=m×F−σ), based on the reception time $T_i$, the reception time $T_{i-m}$, the message transmission period F, and the constant σ determined according to the value of m that are read out at step S301 (S302). When $T_i - T_{i-m} < M$ (Yes at step S302), the unauthorized-transmission determination unit 22 determines that an unauthorized transmission has taken place in the period from $T_{i-m}$ to $T_i$ (step S303), and when $T_i - T_{i-m} \geq M$ (No at step S302), the unauthorized-transmission determination unit 22 determines that an unauthorized transmission has not taken place in the period from $T_{i-m}$ to $T_i$ (step S304).

Figure 13:
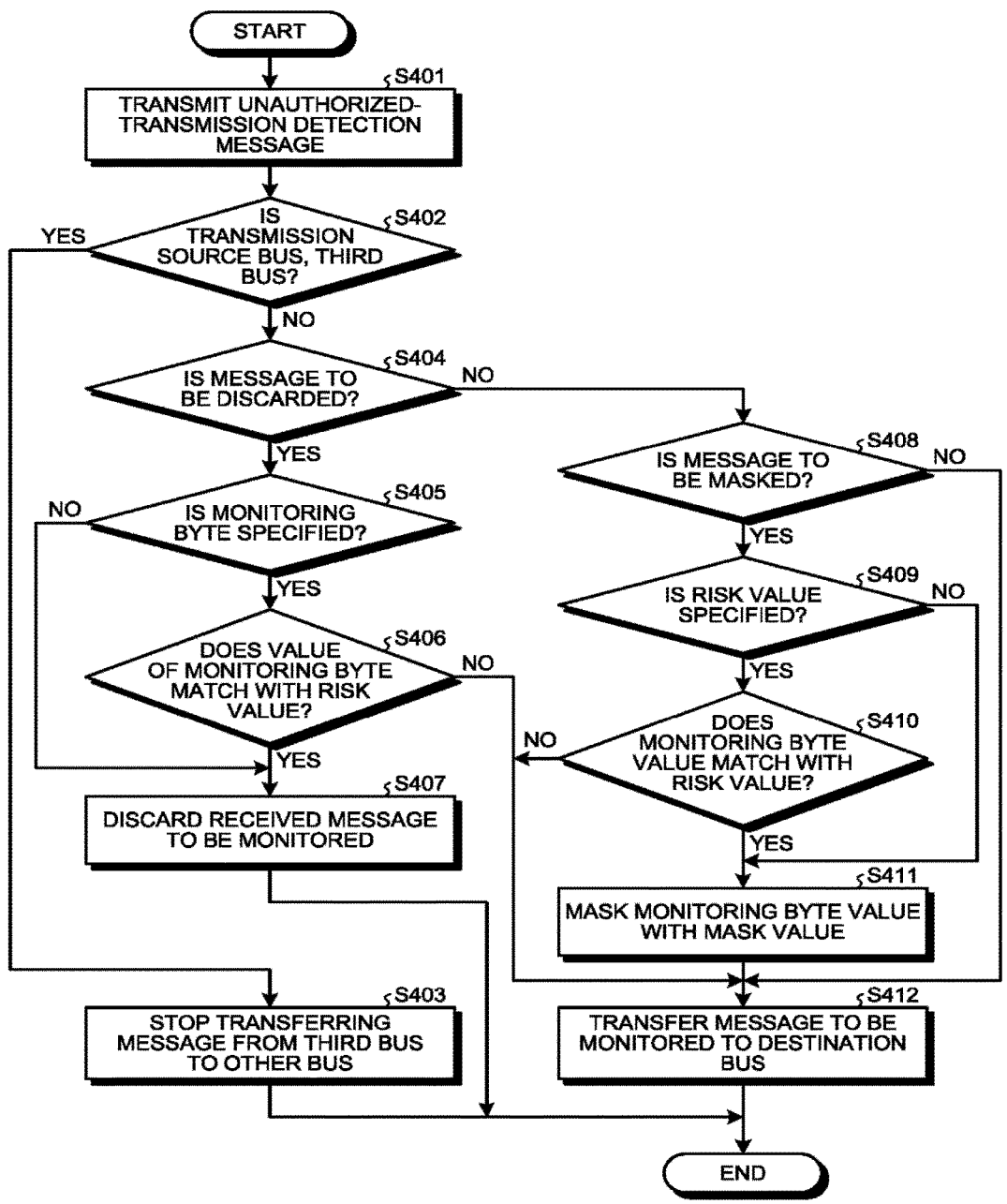
FIG. 13 is a flowchart illustrating a processing procedure of unauthorized-transmission detection time processing.

Next, an example of the unauthorized-transmission detection time processing at step S105 in FIG. 11 will be described with reference to FIG. 13. FIG. 13 is a flowchart illustrating a processing procedure of the unauthorized-transmission detection time processing executed by the unauthorized-transmission detection time processing unit 24.

When the unauthorized-transmission detection time processing is started, the unauthorized-transmission detection time processing unit 24 transmits an unauthorized-transmission detection message from the transmission unit 13, to the transmission source bus and the destination bus of the message to be monitored that is received by the reception unit 12 (step S401).

Next, the unauthorized-transmission detection time processing unit 24 determines whether the transmission source bus of the message to be monitored that is received by the reception unit 12 is the third bus B3 including the ECU 301 for the IVI (step S402). When the transmission source bus is the third bus B3 (Yes at step S402), the unauthorized-transmission detection time processing unit 24 stops transferring a message from the third bus B3 to the other bus step S403).

On the other hand, when the transmission source bus is not the third bus B3 (No at step S402), the unauthorized-transmission detection time processing unit 24 refers to the detection time processing table 17, and determines whether the message to be monitored that is received by the reception unit 12 is a message to be discarded (step S404). When the message to be monitored that is received by the reception unit 12 is the message to be discarded (Yes at step S404), the unauthorized-transmission detection time processing unit 24 further determines whether the monitoring byte is specified for the message to be monitored (step S405).

When the monitoring byte is specified (Yes at step S405), the unauthorized-transmission detection time processing unit 24 determines whether the value of the monitoring byte of the message to be monitored that is received by the reception unit 12 matches with the risk value (step S406). When the value of the monitoring byte matches with the risk value (Yes at step 406), the unauthorized-transmission detection time processing unit 24 discards the message to be monitored that is received by the reception unit 12 (step S407). Furthermore, when the monitoring byte is not specified for the message to be monitored that is received by the reception unit 12 (No at step S405), the unauthorized-transmission detection time processing unit 24 discards the message to be monitored that is received by the reception unit 12 (step S407). On the other hand, when the value of the monitoring byte does not match with the risk value (No at step S406), the process proceeds to step S412, which will be described below, and the unauthorized-transmission detection time processing unit 24 transfers the message to be monitored that is received by the reception unit 12 to the destination bus.

When the message to be monitored that received by the reception unit 12 is not the message to be discarded (No at step S404), the unauthorized-transmission detection time processing unit 24 then determines whether the message to be monitored that is received by the reception unit 12 is a message to be masked (step S408). When the message to be monitored that is received by the reception unit 12 is the message to be masked (Yes at step S408), the unauthorized-transmission detection time processing unit 24 further determines whether the risk value is specified for the message to be monitored (step S409).

In this process, when the risk value is specified (Yes at step S409), the unauthorized-transmission detection time processing unit 24 determines whether the value of the monitoring byte of the message to be monitored that is received by the reception unit 12 matches with the risk value (step S410). When the value of the monitoring byte matches with the risk value (Yes at step S410), while masking the value of the monitoring byte with the mask value (step S411), the unauthorized-transmission detection time processing unit 24 transfers the message to be monitored that is received by the reception unit 12 to the destination bus (step S412). Furthermore, when the risk value is not specified for the message to be monitored that is received by the reception unit 12 (No at step S409), while masking the value of the monitoring byte with the mask value (step S411), the unauthorized-transmission detection time processing unit 24 transfers the message to be monitored that is received by the reception unit 12 to the destination bus (step S412).

When the value of the monitoring byte does not match with the risk value (No at step S410), the unauthorized-transmission detection time processing unit 24 transfers the message to be monitored that is received by the reception unit 12 to the destination bus, without masking the value of the monitoring byte (step S412). Furthermore, when the message to be monitored that is received by the reception unit 12 is not the message to be masked (No at step S408), the unauthorized-transmission detection time processing unit 24 transfers the message to be monitored that is received by the reception unit 12 to the destination bus as it is (step S412).

Effects of Embodiment

As described above in detail with a specific example, in the present embodiment, the presence of an unauthorized transmission on the received message to be monitored, in a period from the m previous reception time $T_{i-m}$ to the latest reception time $T_i$ is determined, every time a message to be monitored is received. Consequently, in the present embodiment, it is possible to accurately determine the presence of an unauthorized transmission of a message, without losing the real-time property.

More specifically, the main aim of the conventional technology that detects an unauthorized transmission of a periodically transmitted message is to determine the legitimacy of a message upon receiving the message. Thus, for example, in the method for detecting the period abnormalities, to correctly determine the legitimacy of the received message while taking into account the delay in the network and the like described above, long waiting time is required and processing is delayed (in other words, the real-time property is degraded). When the waiting time is shortened to prevent the real-time property from being lost, the unauthorized transmission is apt to be overlooked and misdetection tends to increase. Furthermore, in the method for detecting the unauthorized transmission by applying a filter to the predetermined transmission period of a message, a margin needs to be set for the filter against the variation in the reception period. Thus, when the margin is increased, the message transmitted in an unauthorized manner is apt to be overlooked, and when the margin is narrowed, misdetection of the authorized message as the unauthorized transmission tends to increase. Furthermore, the two methods described above both need a determination reference time. However, when the reference time is to be determined using a method of synchronizing the transmission and reception times with the ECU of the message transmission side, a mechanism for maintaining the synchronization is required, thereby increasing the cost. Furthermore, in a method in which the reception time of the past message is used as a reference, when the past message is transmitted in an unauthorized manner (when the unauthorized transmission is overlooked), it is not possible to determine correctly.

On the other hand, in the present embodiment, the presence of an unauthorized transmission in the period from the m previous reception time $T_{i-m}$ to the latest reception time $T_i$ is determined, instead of determining whether the received message is a message that is transmitted in an unauthorized manner. Consequently, it is possible to immediately determine the presence of an unauthorized transmission, when the message to be monitored is received. Furthermore, even if the latest received message to be monitored is a message that is transmitted in an unauthorized manner, and the unauthorized transmission cannot be detected at the time, it is possible to detect the unauthorized transmission when the message to be monitored having the same CAN ID is received the next time.

Furthermore, in the present embodiment, an unauthorized-transmission detection message is transmitted to the network, as the unauthorized-transmission detection time processing when it is determined that an unauthorized transmission has taken place. Consequently, the other ECU on the network and the like can perform retrospective processing based on the unauthorized-transmission detection message. Furthermore, when the transmission source bus of the message to be monitored that is determined to be an unauthorized transmission is a bus that is connected to the outside of the vehicle, the message transfer from the bus can be entirely stopped, as the unauthorized-transmission detection time processing. Thus, information security can be ensured. Furthermore, for example, when the message to be monitored that is determined to be an unauthorized transmission is a message that affects the control of the vehicle, it is possible to prevent in advance an unexpected behavior of the vehicle caused by the unauthorized transmission of a message, by discarding the received message to be monitored or masking a part of the received message to be monitored, as the unauthorized-transmission detection time processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A network monitoring device that monitors a message that is periodically transmitted in a network in which the message identified by an identifier is transmitted and received, the network monitoring device, comprising:
   a reception time recording unit, implemented in computer hardware, configured to record a reception time in association with the identifier, every time a message to be monitored is received; and
   an unauthorized-transmission determination unit, implemented in computer hardware, configured to determine presence of an unauthorized transmission on the received message to be monitored, based on a latest reception time $T_i$, a reception time $T_{i-m}$ of the m-th previous message, a message transmission period F, and a constant σ determined in advance, in a period from the reception time $T_{i-m}$ to the reception time $T_i$, every time the message to be monitored is received, wherein
   the unauthorized-transmission determination unit calculates an integer part k of $(T_i T_{i-m}+σ)/F$, and determines that an unauthorized transmission takes place when m-k is equal to or more than one.

2. The network monitoring device according to claim 1, wherein in a case where m=1, when a maximum value of delay in the network is $\Delta max$, the constant $\sigma$ is set to a value that satisfies $\Delta max \leq \sigma < (F-\Delta max)/2$.

3. The network monitoring device according to claim 1, wherein in a case where $m \geq 2$, when a maximum value of delay in the network is $\Delta max$, the constant $\sigma$ is set to a value that satisfies $\Delta max \leq \sigma < F-\Delta max$.

4. A network monitoring device that monitors a message that is periodically transmitted in a network in which the message identified by an identifier is transmitted and received, the network monitoring device, comprising:
 a reception time recording unit, implemented in computer hardware, configured to record a reception time in association with the identifier, every time a message to be monitored is received; and
 an unauthorized-transmission determination unit, implemented in computer hardware, configured to determine presence of an unauthorized transmission on the received message to be monitored, based on a latest reception time $T_i$, a reception time $T_{i-m}$ of the m previous message, a message transmission period F, and a constant $\sigma$ determined in advance, in a period from the reception time $T_{i-m}$ to the reception time $T_i$, every time the message to be monitored is received, wherein
 the unauthorized-transmission determination unit sets a threshold M to be $M=m \times F-\sigma$, and determines that an unauthorized transmission takes place when $T_i-T_{i-m}$ is less than the threshold M.

5. The network monitoring device according to claim 4, wherein in a case where m=1, when a maximum value of delay in the network is $\Delta max$, the constant $\sigma$ is set to a value that satisfies $\Delta max \leq \sigma < (F-\Delta max)/2$.

6. The network monitoring device according to claim 4, wherein in a case where $m \geq 2$, when a maximum value of delay in the network is $\Delta max$, the constant $\sigma$ is set to a value that satisfies $\Delta max \leq \sigma < F-\Delta max$.

7. The network monitoring device according to claim 1, further comprising an unauthorized-transmission detection time processing unit, implemented in computer hardware, configured to execute predetermined unauthorized-transmission detection time processing, when the unauthorized-transmission determination unit determines that an unauthorized transmission takes place.

8. The network monitoring device according to claim 7, wherein the unauthorized-transmission detection time processing unit executes a process of transmitting an unauthorized-transmission detection message including the identifier of the message to be monitored that is determined to be an unauthorized transmission, to the network, as the unauthorized-transmission detection time processing.

9. The network monitoring device according to claim 8, wherein the unauthorized-transmission detection time processing unit further executes a process of discarding the received message to be monitored, as the unauthorized-transmission detection time processing.

10. The network monitoring device according to claim 9, wherein the unauthorized-transmission detection time processing unit discards the message to be monitored, when a value of a certain position of the received message to be monitored is a predetermined value.

11. The network monitoring device according to claim 7, wherein the unauthorized-transmission detection time processing unit executes a process equivalent to normal time processing that is executed when the unauthorized-transmission determination unit determines that an unauthorized transmission does not take place, after masking a certain position of the received message to be monitored with a certain value, as the unauthorized-transmission detection time processing.

12. The network monitoring device according to claim 11, wherein the unauthorized-transmission detection time processing unit masks the certain position of the message to be monitored with the certain value, when a value of the certain position of the received message to be monitored is a predetermined value.

13. The network monitoring device according to claim 7, wherein the unauthorized-transmission detection time processing unit executes a process of stopping normal time processing that is executed when the unauthorized-transmission determination unit determines that an unauthorized transmission does not take place, on a message that is received from a bus identical to a bus of the message to be monitored that is determined as an unauthorized transmission, as the unauthorized-transmission detection time processing.

14. A computer program product having a non-transitory computer readable recording medium including a plurality of instructions, wherein the instructions, when executed by the computer, cause the computer to perform:
 recording a reception time in association with an identifier, every time a message to be monitored is received, the message to be monitored being periodically transmitted in a network in which a message identified by the identifier is transmitted and received; and
 determining presence of an unauthorized transmission on the received message to be monitored, based on a latest reception time $T_i$, a reception time $T_{i-m}$ of an m-th previous message, a message transmission period F, and a constant $\sigma$ determined in advance, in a period from the reception time $T_{i-m}$ to the reception time $T_i$, every time the message to be monitored is received, wherein
 the determining includes
  calculating an integer part k of $(T_i-T_{i-m}+\sigma)/F$, and
  determining that an unauthorized transmission takes place when m-k is equal to more than one.

15. A computer program product having a non-transitory computer readable recording medium including a plurality of instructions, wherein the instructions, when executed by the computer, cause the computer to perform:
 recording a reception time in association with an identifier, every time a message to be monitored is received, the message to be monitored being periodically transmitted in a network in which a message identified by the identifier is transmitted and received; and
 determining presence of an unauthorized transmission on the received message to be monitored, based on a latest reception time $T_i$, a reception time $T_{i-m}$ of an m-th previous message, a message transmission period F, and a constant $\sigma$ determined in advance, in a period from the reception time $T_{i-m}$ to the reception time $T_i$, every time the message to be monitored is received, wherein
 the determining includes
  setting a threshold M to be $M=(m \times F)-\sigma$, and
  determining that an unauthorized transmission takes place when $T_i-T_{i-m}$ is less than the threshold M.

* * * * *